UNITED STATES PATENT OFFICE.

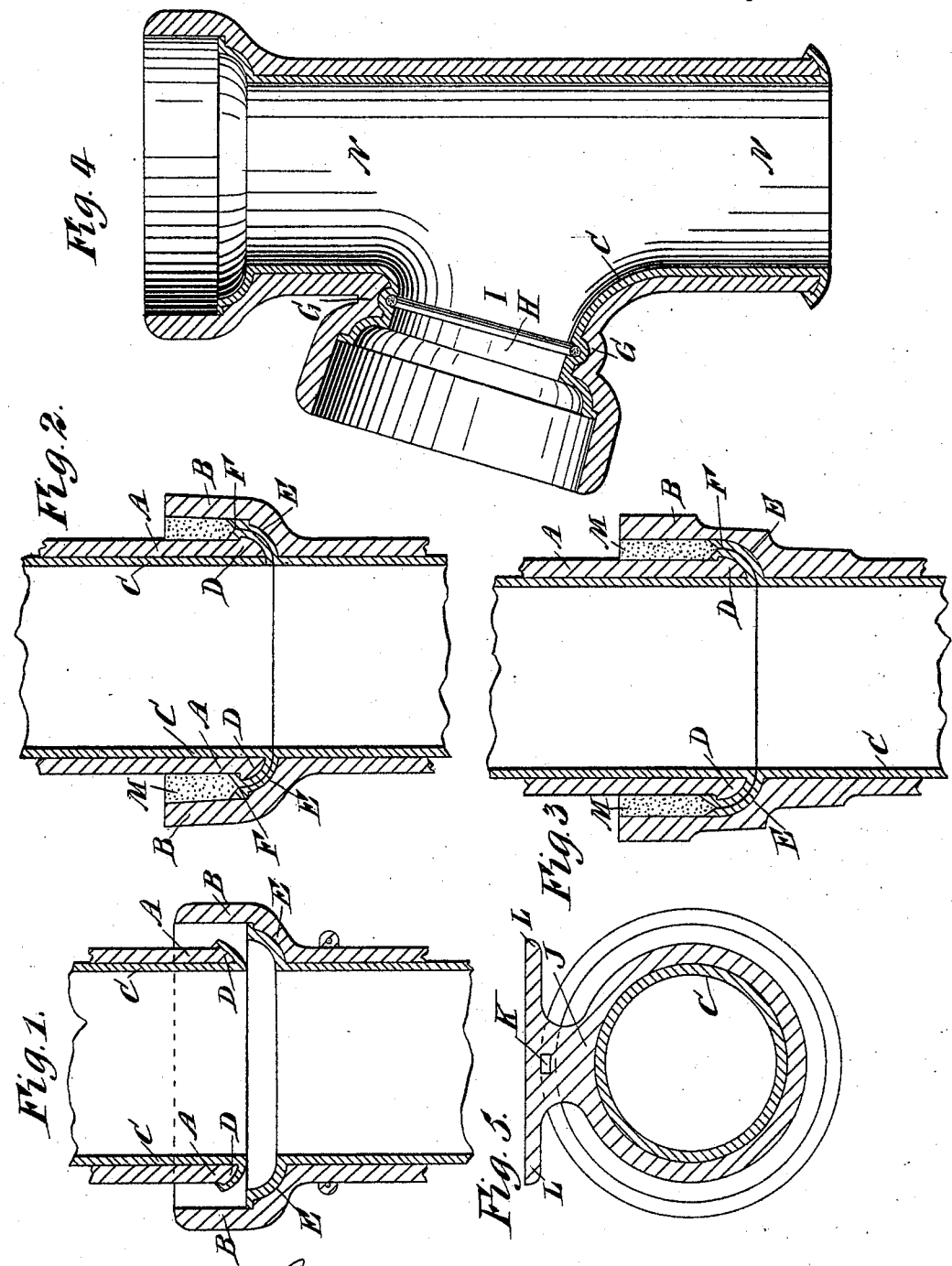

DOUGLAS GEORGE BRIGHTON AND EDWIN MARTYN VENNING, OF LONDON, ENGLAND.

LEAD-LINED PIPE-JOINT.

SPECIFICATION forming part of Letters Patent No. 582,258, dated May 11, 1897.

Application filed August 21, 1895. Serial No. 560,048. (No model.)

*To all whom it may concern:*

Be it known that we, DOUGLAS GEORGE BRIGHTON and EDWIN MARTYN VENNING, subjects of Her Majesty Queen Victoria, residing at 102ᴬ Victoria Street, London, England, have invented certain new and useful Improvements in the Manufacture of Lined Pipes; and we do hereby declare that the following is a full, clear, and exact description of the invention, which will enable others skilled in the art to which it appertains to make and use the same.

Our invention relates to improvements in the lining of iron or other pipes with lead for use in the construction of soil, ventilating, waste, or drain pipes or other purposes where it is important to have a pipe free from any liability to corrosion, such as a lead pipe, and possessing all the strength and the ease and cheapness of fixing, laying, and jointing of an iron or other pipe.

The object of this invention is to provide a lead-lined pipe which has these advantages combined; and it consists in inserting or molding a lining of lead in an iron or other pipe of suitably strong and hard material, the lead lining being continued, expanded, fitted, or molded into the joint of the exterior pipe or shell, so as to form a lining for and become, by fusion, pressure, or otherwise, a part of the jointing material of the joint of the outer pipe or shell.

Hitherto it has been the common practice to use lead pipes, mainly because of their non-corrosive and lasting qualities, for soil, ventilating, waste, or drain pipes without any outer protecting-shell. Owing, however, to the lack of strength and softness of the lead pipe it is liable to become twisted, indented, or flattened to such an extent as to narrow considerably the bore or diameter of the pipe, causing stoppages and an unhealthful condition of things, and where a lead lining or lead pipes have been used in connection with an outer protecting-shell the joints of the adjacent pipe-sections have been made through the medium of couplings, and thus the cost of the construction of such joints has been greatly added to. Moreover, the cost of fixing perpendicularly to any wall a lead pipe is much more than that of placing similarly an iron pipe. In the matter, therefore, of fixing our improved lead-lined pipe a great saving in labor and expense is effected over the usual means of attaching a lead pipe.

The other advantages of our invention are that a smaller thickness of lead and of iron or other material of the outer shell may be adopted than is usual when lead and iron tubes are used separately, first, because the lead is supported and protected by the iron or other outer shell, and, second, because the interior of the latter, being protected from moisture by the lead lining, is not liable to corrode.

These improvements are applicable to iron or other pipes with ordinary spigot and socket or any form of such joint, but we prefer to use in connection with our invention a special form of spigot-and-socket joint, approximating to a ball-and-socket joint, in which the spigot end, having a rounded or beveled annular bead or rim, fits into a corresponding recessed, rounded, or beveled annular shoulder in the socket, which keeps the spigot end in a concentric position with regard to the walls of the socket, secures a true invert, and facilitates the process of jointing.

In order that our invention may be the more easily understood, we will now proceed to describe the same and the means of carrying it into effect with reference to the special joint above referred to and the drawings annexed to this specification.

Figure 1 is a longitudinal section of our improved lead-lined pipe with our special joint, showing the spigot end and the socket a short distance apart. Fig. 2 is a longitudinal section of the same, showing spigot and socket jointed together. Fig. 3 shows our improved system of lead lining applied to the ordinary spigot-and-socket joint. Fig. 4 is a longitudinal section of a junction, showing an annular recess G to facilitate the process of jointing. Fig. 5 is a cross-section of Fig. 1, showing a lug on the pipe for attaching the same to buildings.

The lead lining C, Fig. 1, may be run into or molded in the iron or other outer pipe A and B by means of suitable cores, or may be a lead pipe inserted in the outer shell A and B and expanded by means of what are known usually as "bobbins" or round tapering pins, which are driven into the pipe in succession, so as to fit tightly against the walls of the outer shell. The lead lining C, Fig. 1, is continued, expanded, and fitted or molded by the aid of suitable metal dies or of cores over the exterior rounded bead or rim D on the spigot end A of the outer shell, and also continued, expanded, fitted, or molded over by similar means the annular recessed shoulder E in the socket B, so that when the spigot end is inserted into the socket B, as shown in Fig. 2, the butt-ends F of the lead lining are placed in a position of contiguity to each other and may readily be beaten, staved, or pressed together and so effectually prevent the molten lead or other jointing material M from passing into the interior of the pipe. When the molten lead is poured into the socket, the butt-ends F of the lead lining become also fused together with jointing material, so that a gas and water tight joint of great strength and durability is made. Fig. 3 shows our improved system of lead lining applied to the ordinary spigot and joint, the lead lining being continued, expanded, and fitted or molded around the spigot end D and also over the bottom or butt-end E and for some distance along the walls of the socket. Fig. 4 is a junction-piece showing the mode we adopt in lead-lining the same according to our invention. G is an annular recess in the wall of the projecting piece H near its union with the straight pipe N. When the lead lining is inserted in the straight length of pipe N, a hole is cut in the lead at the part I where the projecting piece H starts from the straight pipe, leaving a marginal rim or edge of lead all around, which is expanded, turned, and fitted into the recess G. In like manner the end of the lead lining inserted in the projecting piece H is expanded, turned, and fitted into the recess G, forming a bead filling said recess, as shown, and the butt-ends of the lead are jointed with plumbers' or other fusing metal and wiped flush with the lining. Fig. 4. shows only one form of junction, but all other forms of junctions or branch fittings are lead-lined in a similar way.

Fig. 5 is a cross-section of Fig. 1, showing the means we prefer to adopt in fixing our improved lead-lined soil, ventilating, or waste pipes perpendicularly to a wall.

J is a lug molded on the pipe a short distance below the socket B.

K is a hole through which an iron pin with upwardly-turned end fixed to the wall by the usual means is inserted, so that the pipe may be suspended and held fast any distance required from the wall; or where it is more convenient the pipes may be fixed to the wall in the usual manner through the holes in the projecting sides L of the lug. When our improved lead-lined pipes are laid horizontally, as drain-pipes, the lug J is dispensed with as unnecessary.

To secure a perfect joint between the two linings, we prefer to make the lining in the socket with a concave seating-surface adapted to receive the correspondingly-shaped convex surface of the lining on the spigot end. This construction also effects an accurate centering of the spigot in the socket.

In order to prevent the free or exposed end of the lining from moving longitudinally in the socket or on the spigot end of the pipes, we prefer to form either said spigot or socket, or both, with annular shoulders, such as indicated at A' and B'. These shoulders will effectively prevent any longitudinal slipping of the lining, and since the position of said lining becomes unchangeable an accurate joint will be readily obtained.

Having fully described our invention, what we claim, and desire to secure by Letters Patent, is—

1. In a pipe-coupling, a pipe-section provided with a socket at one end, and an interior lining having a concave seat within said socket, and a mating pipe-section provided with a spigot end adapted to so fit into the socket of the first-named pipe-section as to leave between said spigot and socket an annular free space open to the outside for the reception of jointing material, the second-named pipe-section being provided with an interior lining extending over the end and the outer surface of the spigot, said lining being provided with a convex surface to fit the concave seat in the lining of the socket, substantially as described.

2. The combination with a pipe-section provided with a socket at one end, and an interior lining having a concave seat within said socket, of a mating pipe-section provided with a spigot end adapted to so fit into the socket of the first-named pipe-section as to leave between said spigot and socket an annular free space open to the outside for the reception of jointing material, the second-named pipe-section being provided with an interior lining extending over the end and part of the outer surface of the spigot, said lining being provided with a convex surface to fit the concave seat in the lining of the socket, and a filling of jointing material located in the annular space between the spigot and its socket, said jointing material being in contact with the free or exposed abutting surfaces of the linings of both pipe-sections, substantially as described.

3. A lined junction-pipe provided with an exterior pipe having an interior annular recess in its branch, and an interior lining-pipe extending with its arm into the said branch and its recess, and a projecting piece of lining-pipe fitted into the outer part of the branch and abutting with its inner end in the said recess in the bend or throat of the branch, and means for covering the joint of the abutting ends of the lining-arm and projecting piece, substantially as described.

Dated this 31st day of July, 1895.

DOUGLAS GEORGE BRIGHTON.
EDWIN MARTYN VENNING.

Witnesses:
ROBERT EWING,
JOSEPH LAKE.